United States Patent [19]

Yamamoto et al.

[11] Patent Number: 4,864,602
[45] Date of Patent: Sep. 5, 1989

[54] PABX-CONNECTED FACSIMILE MACHINE

[75] Inventors: Shoji Yamamoto, Atsugi; Yuichi Saito, Hadano, both of Japan

[73] Assignee: Ricoh Company, Ltd., Tokyo, Japan

[21] Appl. No.: 201,354

[22] Filed: May 27, 1988

Related U.S. Application Data

[63] Continuation of Ser. No. 925,419, Oct. 31, 1986, abandoned.

[30] Foreign Application Priority Data

Oct. 31, 1985 [JP] Japan ................... 60-242970

[51] Int. Cl.⁴ ............... H04M 11/00; H04N 1/00; H04N 1/32
[52] U.S. Cl. .................. 379/100; 379/355; 358/434
[58] Field of Search ............. 379/96, 97, 98, 100, 379/216, 354, 355, 442; 358/256, 257

[56] References Cited

U.S. PATENT DOCUMENTS

| | | | |
|---|---|---|---|
| 4,434,326 | 2/1984 | Koeck et al. | 379/355 X |
| 4,453,040 | 6/1984 | Wolf et al. | 379/355 |
| 4,524,244 | 6/1985 | Faggin et al. | 379/96 X |
| 4,613,730 | 9/1986 | Fechalos et al. | 379/355 |
| 4,710,951 | 12/1987 | Itezono | 379/100 |
| 4,741,029 | 4/1988 | Hase et al. | 379/355 X |
| 4,764,951 | 8/1988 | Kotani et al. | 379/100 |

FOREIGN PATENT DOCUMENTS

| | | | |
|---|---|---|---|
| 58-179062 | 10/1983 | Japan | 358/257 |
| 60-10877 | 1/1985 | Japan | 379/100 |

*Primary Examiner*—Keith E. George
*Attorney, Agent, or Firm*—Oblon, Spivak, McClelland, Maier & Neustadt

[57] ABSTRACT

A facsimile machine includes an automatic calling and answering net control unit (AA-NCU) which is connected to a private automatic branch exchange (PABX). The AA-NCU has three modes of operation in accessing an outside line, typically a public telephone line. The access mode of operation is set and stored when the facsimile machine is first connected to a particular PABX having a particular outside line access mode. A call control procedure is also set and stored in the facsimile machine. When the information input by an operator agrees with the stored call control procedure, the AA-NCU is controlled to place a call to an outside line in a mode appropriate for the associated PABX automatically.

6 Claims, 6 Drawing Sheets

PABX-CONNECTED FACSIMILE MACHINE

This application is a continuation of application Ser. No. 925,419 filed on Oct. 31, 1986, now abandoned.

BACKGROUND OF THE INVENTION

1. Field of the Invention

This invention generally relates to a facsimile machine, and, in particular, to a facsimile machine suitable for use as being connected to a private automatic branch exchange (PABX).

2. Description of the Prior Art

A facsimile machine capable of carrying out an automatic call operation simply by inputting of a destination telephone number and depression of a start button is well known in the art. The facsimile machine of this type, typically, includes an automatic answering net control unit (hereinafter, also referred to as AA-NCU) and a control circuit, such as a central processing unit or simply CPU. Under the control of this control circuit, NCU handles various operations, such as call placement, detection of receipt of a call from a source station, and transmission of image information.

It is often desired that the facsimile machine of this type is connected to an extension of a private automatic branch exchange (hereinafter, also referred to as PABX) and information is transmitted to an outside line through PABX from the facsimile machine connected to an extension thereof. In this case, in a manner similar to the case of calling an outside line from a common extension telephone, it is necessary for the control circuit of the facsimile machine to control AA-NCU so as to advise PABX of the fact that the call is for an outside line prior to transmission of a telephone number.

As shown in FIGS. 4a through 4c, in a structure in which a pair of lines L1 and L2, constituting an extension of PABX 1, is connected to an AA-NCU 2 of a facsimile machine and also to a telephone, when a call to an outside line is to be designated by AA-NCU 2 to PABX 1, there are three outside line access methods depending on the kind of the PABX 1 used. FIG. 4a shows the first access method, in which a relay switch S1 is switched from the telephone to the facsimile machine, thereby establishing a connection to PABX 1, and, then, a particular dial number, such as "0", is transmitted by a dial pulse generating circuit DP to PABX 1, so that PABX 1 will recognize this call to be intended for an outside line, thereby connecting the facsimile machine to an outside line. This access method is also referred to as a number type. The second access method is shown in FIG. 4b, and, as shown, an additional relay S2 is provided in series with one of the pair of lines L1 and L2 (L2 in the illustrated case) within AA-NCU 2. This method is also referred to as a flash type. This relay S2 is normally closed; however, when a call is to be placed to an outside line, as shown in FIG. 4b, after switching the relay switch S1 similarly as described above, the relay S2 is set open for a predetermined time period. Because of this, PABX 1 recognizes this call to be intended to an outside line, and, thus, establishes a connection to an outside line. FIG. 4c shows the third access method, in which AA-NCU 2 of the facsimile machine is connected to PABX 1 through a line G as well as the pair of lines L1 and L2 and the line G is connected to one of the lines L1 and L2 (L2 in the illustrated case) through a relay S3 in the interior of AA-NCU 2. This third method is also referred to as a ground type. The relay switch S3 is normally open; however, when a call to an outside line is requested, the relay switch S3 is closed for a predetermined time period after switching the relay switch S1 similarly as described above. From this, PABX 1 recognizes this call to be intended for an outside line and thus establishes a connection to an outside line.

As described above, since there are three types of outside line access method, when calling an outside line from a facsimile machine connected to an extension, the operator must supply the information regarding the outside line access method of the PABX to which the facsimile machine is connected at the time of inputting the telephone number of a destination station. For example, the access method of the PABX to which the facsimile machine is connected is of the number type, a particular number, such as "0", is input prior to the telephone number. If the PABX is of the flash type, "*" must be input prior to the telephone number; whereas, if the PABX is of the ground type, "#" must be input prior to the telephone number. Depending on which of "0", "*" and "#" has been input prior to the telephone number, the control circuit of the facsimile machine determines the outside line access type of the PABX to which it is connected, thereby carrying out a suitable operation to establish a connection to an outside line. However, this is inconvenient for the operation because the operation is required to know the type of the PABX to which the facsimile machine is connected and to carry out an appropriate operation determined by the type of the PABX.

SUMMARY OF THE INVENTION

It is therefore a primary object of the present invention to obviate the disadvantages of the prior art as described above and to provide an improved facsimile machine for use as connected to a private automatic branch exchange.

Another object of the present invention is to provide an improved PABX-connected facsimile machine which is not influenced by a particular type of a public automatic branch exchange to be connected.

A further object of the present invention is to provide an improved PABX-connected facsimile machine convenient and easy to use.

Other objects, advantages and novel features of the present invention will become apparent from the following detailed description of the invention when considered in conjunction with the accompanying drawings.

DESCRIPTION OF THE PREFERRED EMBODIMENTS

Figure 1:
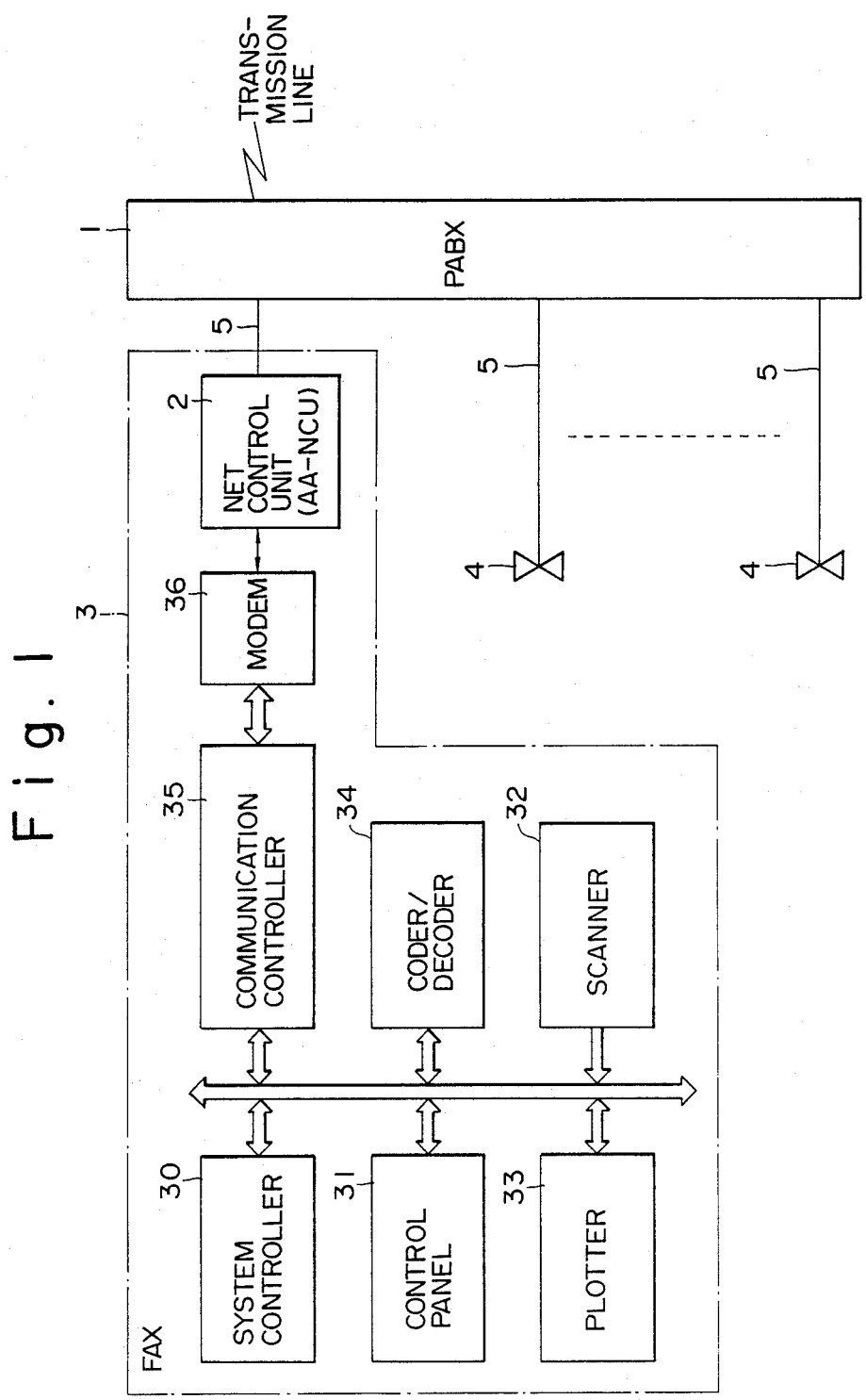
FIG. 1 is a schematic illustration showing a facsimile machine constructed in accordance with one embodiment of the present invention as connected to a PABX.

Referring now to FIG. 1, there is schematically shown a facsimile machine 3 constructed in accordance with one embodiment of the present invention, and the present facsimile machine 3 is connected to one of extensions 5 of a private automatic branch exchange or simply PABX 1. An ordinary telephone 4 is connected to each of the other extensions 5. The facsimile machine 3 includes a system controller 30 which is in charge of the management and control of the overall operation of this facsimile machine and may be advantageously comprised of a microcomputer system. The present facsimile machine 3 also includes a control panel 31 which is provided with a plurality of keys (not shown) and a display device (not shown) for allowing an operator to input various initialization and operational commands for the facsimile machine 3 in accordance with displayed guidance. Also provided in the present facsimile machine 3 is a scanner 32 which optically reads an original document to be transmitted to produce image information, and a plotter 33 is also provided for outputting image information as recorded on recording paper.

The facsimile machine 3 also includes a coder/decoder 34 which compresses image information to be transmitted by coding and restores the coded information to the original image information by decoding upon receipt. In addition, the present facsimile machine 3 includes a communication controller 35 which carries out transmission of image information to a destination station in accordance with a predetermined transmission procedure and which is connected to the single extension 5 of PABX 1 through a MODEM 36, which modulates a signal to be transmitted and demodulates a signal upon receipt, and an automatic answering net control unit or simply AA-NCU 2. The facsimile machine 3 of the present embodiment differs from a conventional facsimile machine in that the condition of accessing an outside line through the PABX 1 can be previously set and that a call is effected by the set outside access condition at the time of transmitting image information and then the transmission of image information is carried out.

Figure 2:
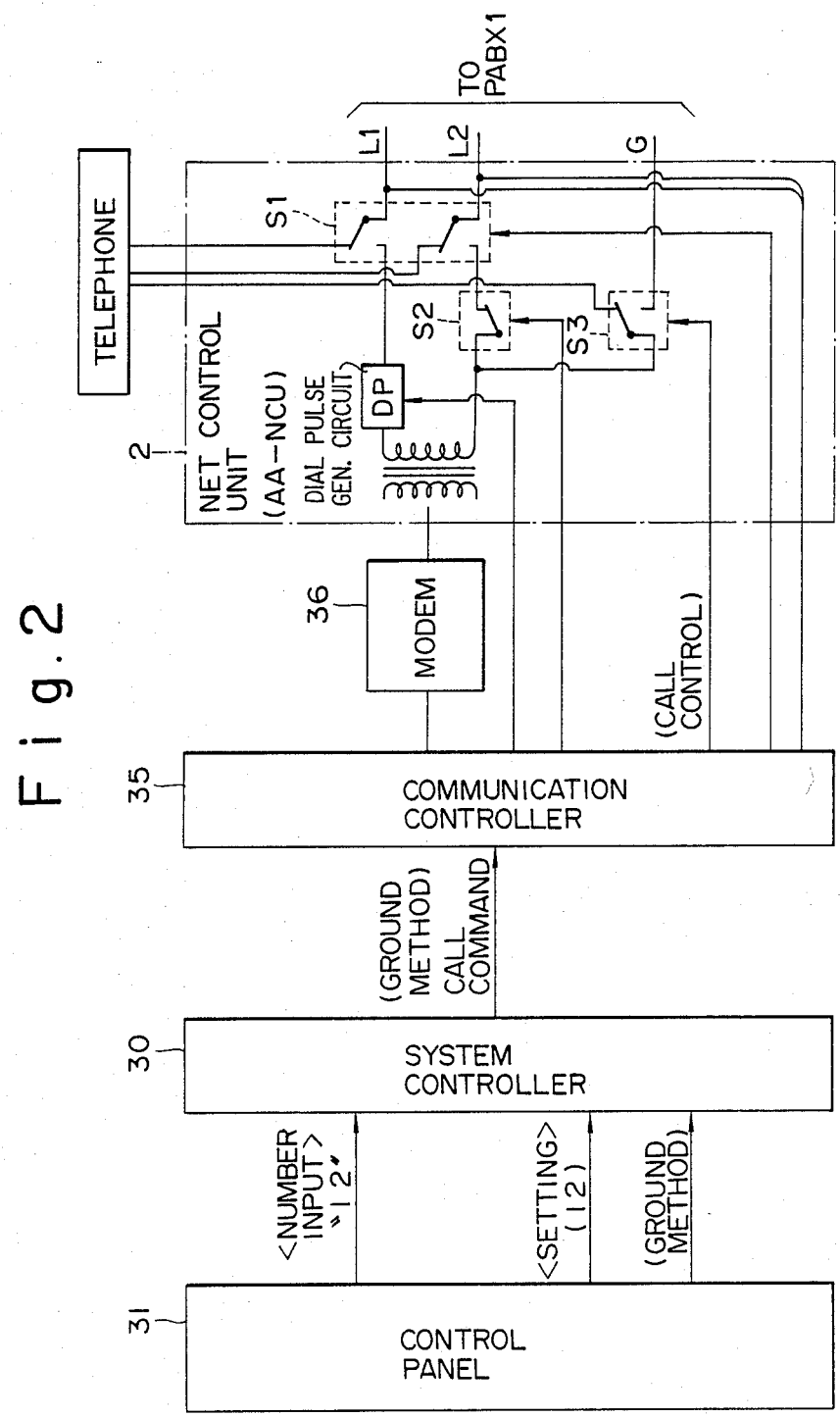
FIG. 2 is a schematic illustration which is useful for explaining an outside line calling operation in the facsimile machine shown in FIG. 1.
Figure 4A:
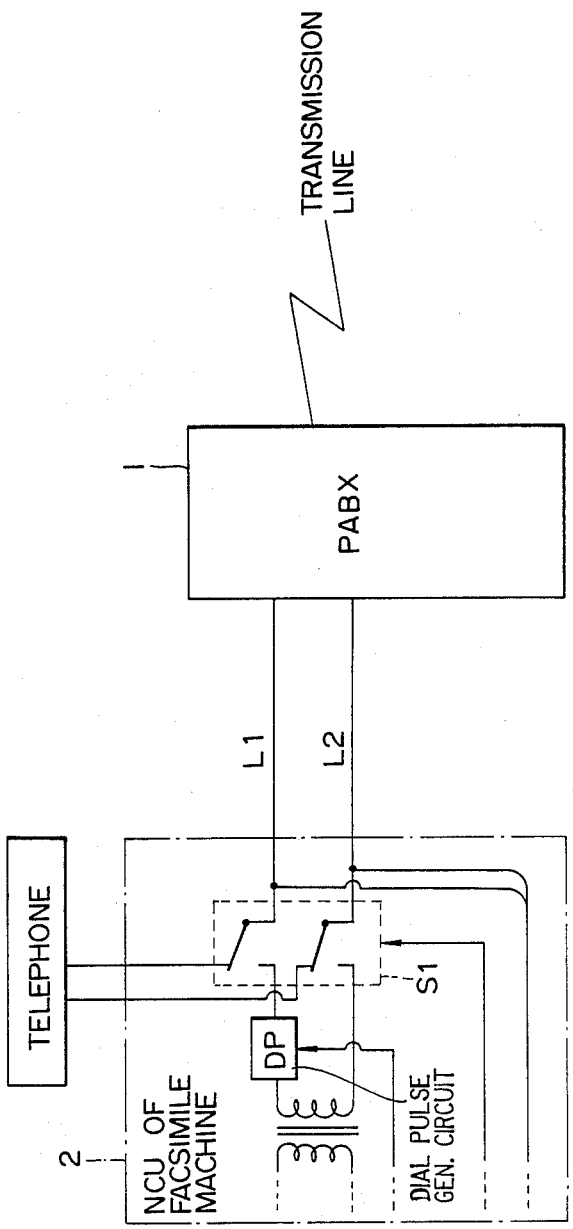
FIGS. 4a through 4c are schematic illustrations showing three types of outside line access method used in a facsimile machine.
Figure 4B:
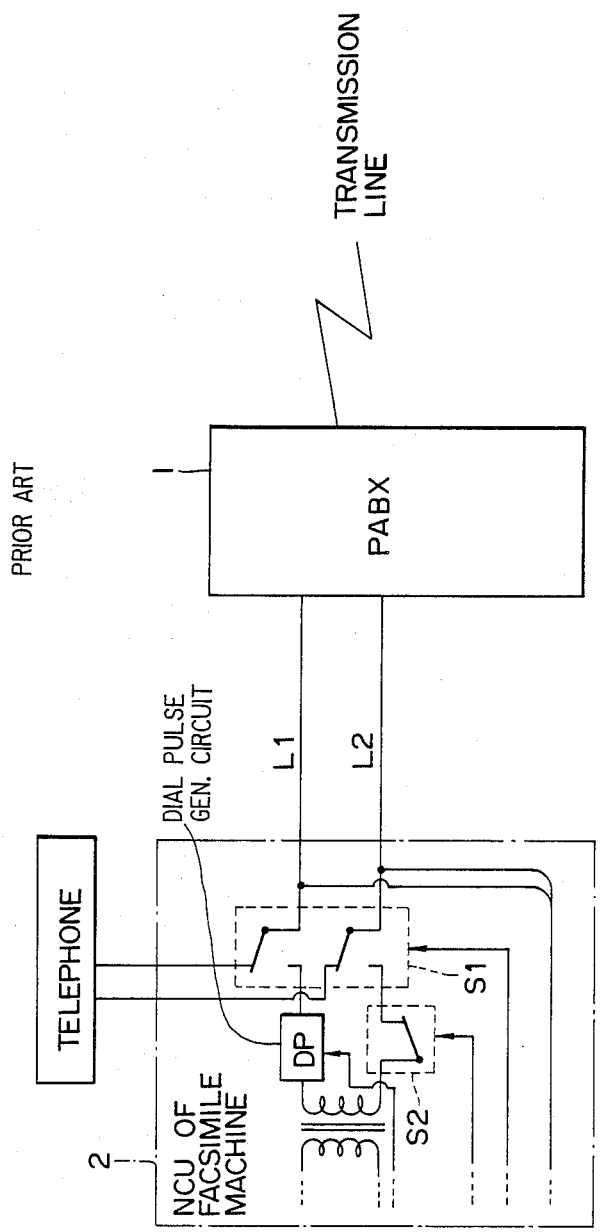
Figure 4C:
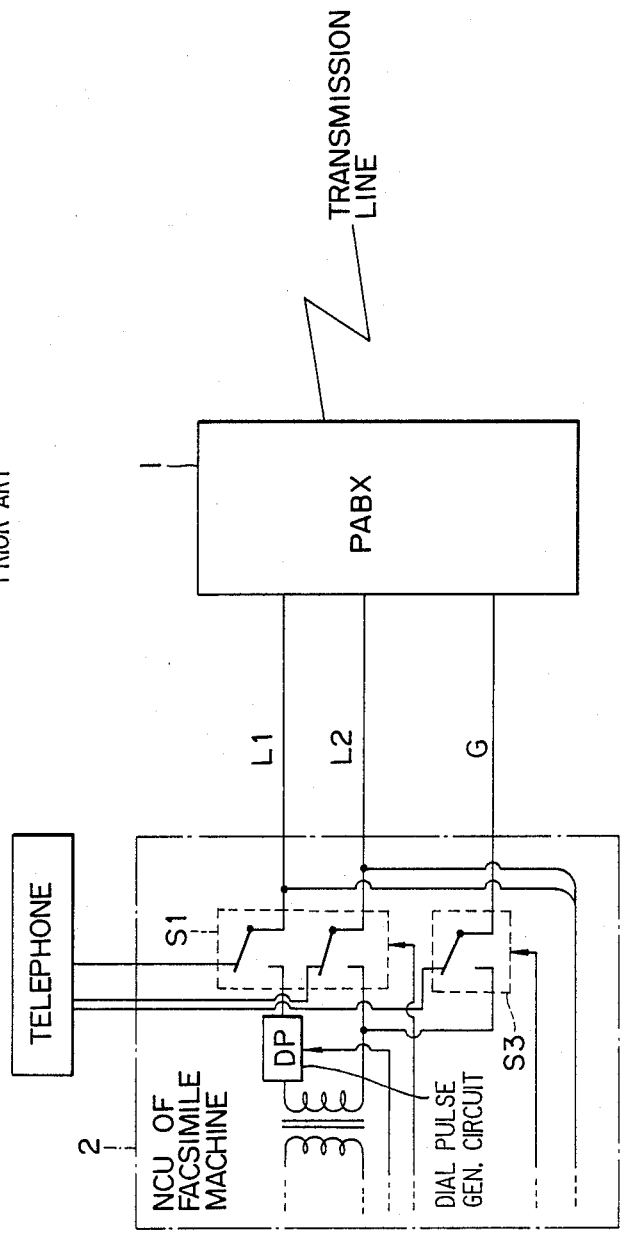

Referring now to FIG. 2, the calling operation of the present facsimile machine 3 will be described in detail below. It is to be noted that like numerals indicate like elements among FIGS. 1, 2 and 4. FIG. 2 shows the structure of AA-NCU 2 which allows calling an outside line from the present facsimile machine connected to an extension of the associated PABX 1 irrespective of the type of the outside line access method employed in the associated PABX 1. That is, if the associated PABX 1 is of the number type, then the pair of lines L1 and L2 is connected to the AA-NCU 2, and when a call is to be placed to an outside line, the relay switch S1 is switched from the telephone to the AA-NCU 2 and a particular dial number is supplied from the dial pulse generating circuit DP to the PABX 1, so that placement of a call to an outside line can be effected. On the other hand, if the associated PABX 1 is of the flash type, the pair of lines L1 and L2 is connected to the AA-NCU 2 in a manner similar to the above-described case, and, at the time of placing a call, the relay switch S1 is similarly switched, and, then, the relay switch S2 is kept open for a predetermined time period, so that placement of a call to an outside line can be effected. If the associated PABX 1 is of the ground type, the PABX 1 is connected to the AA-NCU 2 not only through a pair of lines L1 and L2, but also through a line G. When a call is to be placed, the relay switch S1 is switched in a manner similar to that described above, and, then, the normally open switch S3 is closed for a predetermined time period.

When using this facsimile machine 3 as connected to an extension of PABX 1, the condition for outside line access is previously set. This setting can be effected by setting the control panel 31 in an outside line access condition input mode and inputting the information relating to the type of the outside line access method employed in the PABX 1 and a number or symbol to be used by an operator at the control panel 31 when the operator requests to place a call to an outside line. For example, in accordance with the present invention, by manipulating the control panel 31, the outside line access method can be set to be "number type" and the outside line call designation can be set to be "12". On the other hand, in the case where the present facsimile machine 3 is to be connected directly to the public telephone line, it is previously so set in the control panel 31 that no outside line access operation is required.

In the present embodiment, as an example, it is so set that the outside line access method of the associated PABX 1 is of the "ground type" and the outside line call designation is set by "12".

In operation, when an operator desires to transmit an original to an outside line, the operator manipulates the control panel 31 by first inputting "12" and the telephone number of a destination station, and, then, depressing a transmission start button. In this instance, the system controller 30 reads the number thus input, the previously set outside line call designation "12" described above and the outside line access type "ground type (or method)" from the control panel 31. At the system controller 30, if the number thus input starts with "12", then it determines from the set condition that the outside line access control is required and it is of the ground type. Then, based on this determination, a call command by the ground type or method is supplied to the communication controller 35. At the communication controller 35, in order to effect call placement of the ground type, the relay switch S1 of the AA-NCU 2 is switched to its internal circuit, thereby connecting to a transmission line, and, then, the relay switch S3 is closed for a predetermined time period, thereby apprising the PABX 1 of the fact that this is a call to an outside line.

In this manner, by inputting a previously set number "12" in the above-described embodiment, the system controller 30 recognizes the call to be placed is a call to an outside line so that it carries out an outside line access control appropriate for the associated PABX 1.

Figure 3:
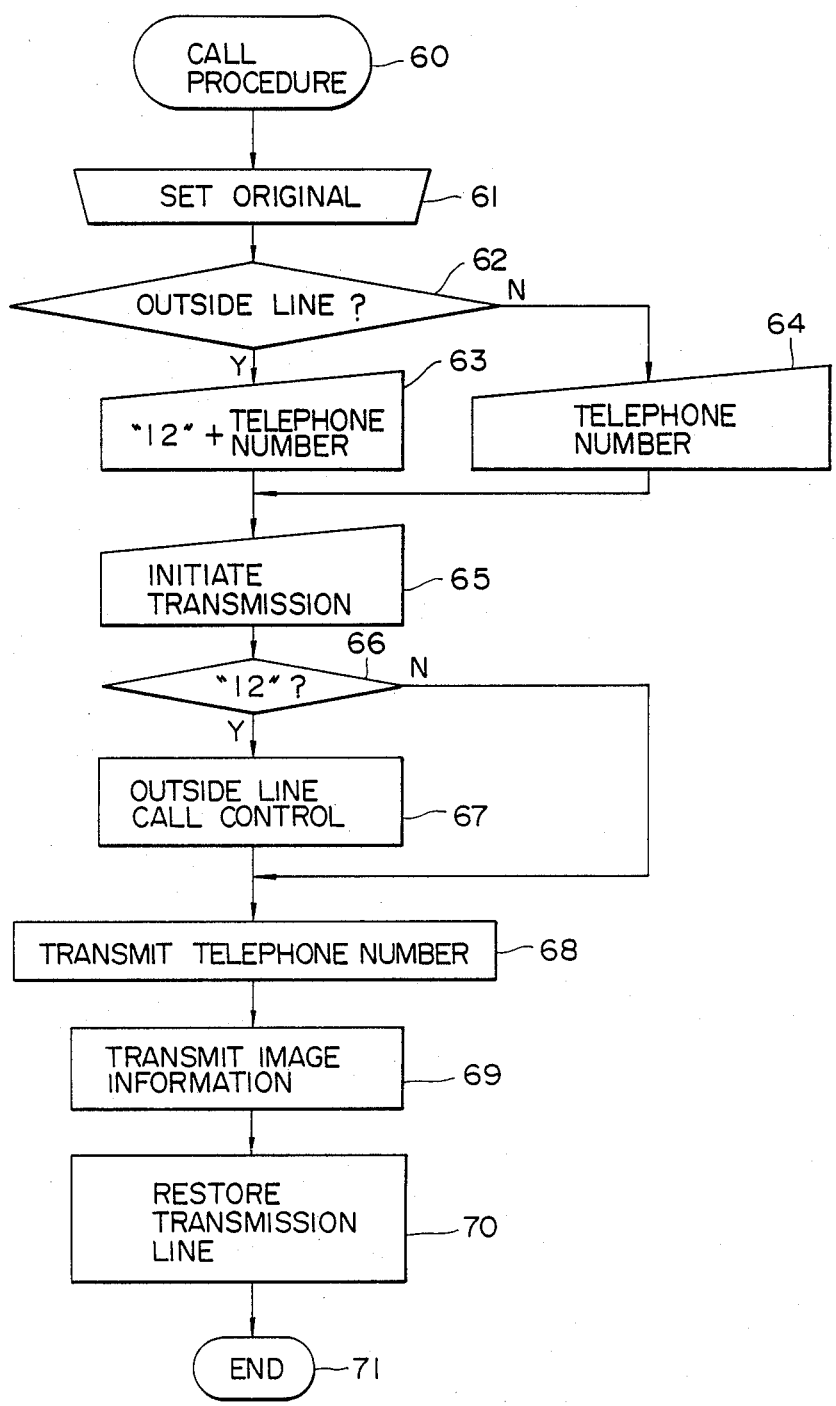
FIG. 3 is a flow chart showing the sequence of steps of outside line calling operation in the facsimile machine shown in FIG. 1.

FIG. 3 illustrates a flow chart showing the sequence of steps of the call placement procedure of the facsimile machine 3. As shown, in the case of a call placement process (step 60), the operator places an original document to be transmitted in position in the scanner 32 (step 61). Then, by manipulating numeric keys (not shown) on the control panel 31, if it is a call to an outside line, then the previously designated number "12" indicating a call to an outside line is first input and then the telephone number of a destination station is input in succession (steps 62 and 63). If it is a call to another extension, then only the extension number is input (step 64). Then, when a transmission start button is depressed (step 65), an automatic call transmission operation is carried out. That is, the system controller 30 reads the contents of the external line access condition set in the control panel 31 as described before and the number thus input. Because of this, it is determined by the system controller 30 that it is necessary to carry out an outside line access control operation and that the designation of outside line call is "12" so that the outside line access method is of the ground type. Then, the first two digits of the thus input number is identified. If these first two digits are "12", then it is determined that the designation of a call to outside line in the associated PABX 1 is required (step 66). Then, it is so controlled that the AA-NCU 2 places a call to an outside line in accordance with the before-mentioned access method of the ground type through the communication controller 35 (step 67).

On the other hand, if the first two digits "12" are not equal to "12", then it is determined that it is a call to another extension (step 66), so that the relay switch S1 is switched to its internal circuit and then it immediately proceeds to a step of sending a telephone number (step 68). It is to be noted that each of extension telephone numbers should be so determined that its first two digits are not equal to "12." Then, the system controller 30 controls the dial pulse generating circuit DP of the AA-NCU 2 through the communication controller 35 to transmit the telephone number of a destination station (step 68). If the facsimile machine of the destination station answers the call, then the communication controller 35 establishes a transmission route via a predetermined transmission control procedure.

Then, the system controller 30 controls the scanner 32 to initiate the reading of image information from the original to be transmitted. The image information thus read is then sequentially transferred to the coder/decoder 34, and then the image information compressed by coding is transferred to the MODEM 36 through the communication controller 35. The image information thus transferred to the MODEM 36 is modulated and supplied onto the associated extension line 5 through the AA-NCU 2 (step 69). Upon completion of reading of the original by the scanner 32 and transmission of its image information, the communication controller 35 controls the AA-NCU 2 through a predetermined control procedure for restoration of transmission line, thereby restoring the transmission line (step 70) and terminate the call placement process (step 71).

As described above, in accordance with the facsimile machine 3 embodying the present invention, the operational procedure for placing a call to an outside line through an associated PABX to be followed by the operator becomes uniform irrespective of the type of the associated PABX. Thus, once properly set at the time of installation, there is no need for the operator to pay attention to the type of the PABX to which the facsimile machine is connected. It is to be noted that the designation of placement of a call to an outside line is effected by "12" in the first two digits of the number input by the operator in the above-described embodiment; however, this designation may be effected by any other combination of numerals or symbols and the designation may be made by a single or two or more numerals or symbols. It should also be noted that, regarding a selection signal for extension lines of the PABX, use may be made not only of the dial pulse type, but also of a push button type, if desired.

While the above describes a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile system comprising:
   facsimile means for transmitting and receiving facsimile data;
   an automatic calling and answering type net control unit means connected between said facsimile means and a private automatic branch exchange (PABX) which is operatively coupled to an outside transmission line and which is operable in a predetermined outside line access mode, said net control unit means being selectively operable in one of a plurality of outside line access modes, including said predetermined outside line access mode, in accordance with a particular type of said private automatic branch exchange;
   setting means for setting said net control unit means to operate in said predetermined outside line access mode of said PABX and an outside line call procedure when requested to transmit information through said outside transmission line;
   operator actuated input means for selecting an outside line, for inputting a destination number and for generating an initiation signal requesting transmission of facsimile data from said facsimile means to said outside line via said net control means and said PABX; and
   control means for controlling said net control unit means in response to said initiation signal to automatically operate in said predetermined outside line access mode to establish a connection to said outside transmission line through said private automatic branch exchange and to call said destination number when the initiation signal is generated by said input means.

2. The facsimile system of claim 1 wherein said plurality of outside line access modes includes a number mode, a flash mode and a ground mode.

3. The facsimile system of claim 1 wherein said net control unit means is connected to said private automatic branch exchange through a pair of first and second lines.

4. The facsimile system of claim 3 wherein said net control unit means includes a first switch having a first state for connecting said pair of first and second lines to a telephone and a second state for connecting to an internal circuit of said net control unit means, and dial pulse generating means connectable to one of said pair of first and second lines through said first switch.

5. The facsimile system of claim 4 wherein said net control unit means further includes a second switch connected in series with one of said pair of first and second lines.

6. The facsimile system of claim 5 wherein said net control unit means is also connected to said private automatic branch exchange through a third line and said net control unit means includes a third switch having a first state connecting the internal circuit of said net control unit means to said telephone and a second state for connecting the internal circuit of said net control unit means to said third line.

* * * * *